(12) United States Patent
Carkner et al.

(10) Patent No.: US 10,319,981 B2
(45) Date of Patent: Jun. 11, 2019

(54) DUAL BUS BATTERY BALANCING SYSTEM

(71) Applicant: Revision Military S.a.r.L., Luxembourg (LU)

(72) Inventors: Steve Carkner, Ottawa (CA); Eric John Georges Andrasi, Ottawa (CA); Paul Lynes, Kanata (CA)

(73) Assignee: Revision Military S.a.r.L., Luxembourg (LU)

( * ) Notice: Subject to any disclaimer, the term of this patent is extended or adjusted under 35 U.S.C. 154(b) by 0 days.

(21) Appl. No.: 15/440,607

(22) Filed: Feb. 23, 2017

(65) Prior Publication Data

US 2017/0244092 A1 Aug. 24, 2017

Related U.S. Application Data

(60) Provisional application No. 62/298,895, filed on Feb. 23, 2016.

(51) Int. Cl.
| | |
|---|---|
| *H01M 2/00* | (2006.01) |
| *H01M 2/34* | (2006.01) |
| *H01M 2/10* | (2006.01) |
| *H01M 2/20* | (2006.01) |
| *H02J 7/00* | (2006.01) |
| *H01M 10/42* | (2006.01) |

(52) U.S. Cl.
CPC ......... *H01M 2/348* (2013.01); *H01M 2/1077* (2013.01); *H01M 2/206* (2013.01); *H02J 7/0016* (2013.01); *H02J 7/0021* (2013.01); *H02J 7/0022* (2013.01); *H02J 7/0026* (2013.01); *H02J 7/0045* (2013.01); *H01M 2010/4271* (2013.01); *H01M 2200/106* (2013.01); *H01M 2220/10* (2013.01)

(58) Field of Classification Search
CPC ............. H01M 2/1077; H01M 2220/10; H02J 7/0021; H02J 7/0016; H02J 7/0045
See application file for complete search history.

(56) References Cited

U.S. PATENT DOCUMENTS

| | | |
|---|---|---|
| 2004/0145346 A1 | 7/2004 | Hall et al. |
| 2013/0015821 A1 | 1/2013 | Kim et al. |

(Continued)

FOREIGN PATENT DOCUMENTS

| | | |
|---|---|---|
| WO | WO 2011/121569 A2 | 10/2011 |
| WO | WO 2013/104047 A1 | 7/2013 |

OTHER PUBLICATIONS

International Search Report and Written Opinion for International Application No. PCT/IB2017/000254, dated Jun. 20, 2017, 13 pages.

(Continued)

*Primary Examiner* — Cynthia H Kelly
*Assistant Examiner* — Monique M Wills
(74) *Attorney, Agent, or Firm* — Wolf, Greenfield & Sacks, P.C.

(57) ABSTRACT

A battery balancing system for parallel connected batteries for balancing batteries that are at dissimilar voltages. The system has first and second buses, connected by a current limiter. A high bus takes energy from the highest voltage battery or batteries in the system and transfers the energy through the current limiter to the low bus, which in turn delivers energy to the lowest voltage battery or batteries in the system.

13 Claims, 2 Drawing Sheets

(56) References Cited

U.S. PATENT DOCUMENTS

| | | | |
|---|---|---|---|
| 2013/0171476 A1* | 7/2013 | Baek | H01M 2/0404 |
| | | | 429/7 |
| 2014/0340022 A1 | 11/2014 | Kang et al. | |
| 2014/0356656 A1 | 12/2014 | Chen et al. | |
| 2015/0108836 A1* | 4/2015 | Hsu | H02M 3/155 |
| | | | 307/24 |
| 2016/0141907 A1* | 5/2016 | Mulawski | H02J 7/0022 |
| | | | 320/107 |

OTHER PUBLICATIONS

PCT/IB2017/000254, Date of Mailing Jun. 20, 2017, International Search Report and Written Opinion.

* cited by examiner

DUAL BUS BATTERY BALANCING SYSTEM

RELATED APPLICATIONS

This Application claims priority under 35 U.S.C. § 119(e) to U.S. Provisional Application Ser. No. 62/298,895, entitled "DUAL BUS BATTERY BALANCING SYSTEM" filed on Feb. 23, 2016, which is herein incorporated by reference in its entirety.

FIELD

Embodiments disclosed herein pertain to the field of battery systems composed of multiple battery modules connected in parallel.

DISCUSSION OF THE RELATED ART

Large battery systems, such as those used in backup power systems, community energy storage or military forward operating bases, are typically constructed from a large bank of batteries which are interconnected. Some connections may be made in parallel between batteries to increase total capacity and some connections may be made in series to increase voltage and instantaneous power.

SUMMARY

According to one embodiment, a system includes a plurality of batteries, each battery having a positive terminal and a negative terminal, and the batteries being connected in parallel among each another. The system further includes a high bus connected to each battery at a high bus terminal on each battery, a low bus connected to each battery at a low bus terminal on each battery, and a current limiter connecting the high bus and the low bus. Also includes are a plurality of high bus diodes, each high bus diode connecting a high bus terminal to the high bus, wherein each high bus diode allows current to flow from its battery to the high bus if a voltage of its battery is higher than a voltage of the high bus. The system also includes a plurality of low bus diodes, each low bus diode connecting a low bus terminal to the low bus, wherein each low bus diode allows current to flow to its battery from the low bus if a voltage of the low diode's battery is lower than a voltage of the low bus.

According to another embodiment, a method of operating a battery balancing system is provided to balance a plurality of parallel-connected batteries, each battery having a positive terminal, a negative terminal, a high bus terminal connected to a high bus, and a low bus terminal connected to a low bus. The method includes allowing current to flow from an initially highest voltage battery to the high bus through a diode, and allowing current to flow from the high bus, through a current limiter, and to the low bus. The method also includes allowing current to flow from the low bus to an initially lowest voltage battery through a diode.

DETAILED DESCRIPTION OF INVENTION

Figure 1:
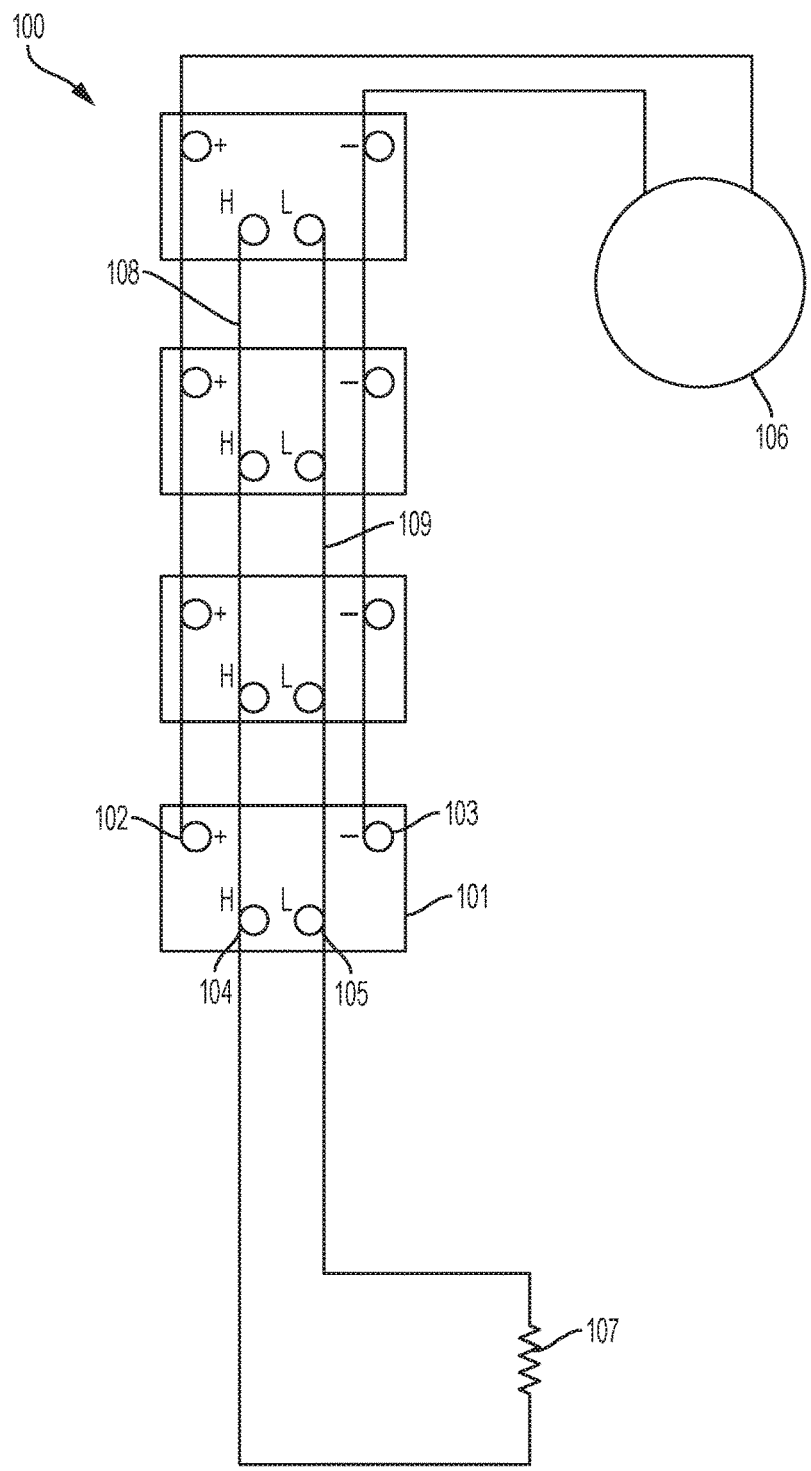
FIG. 1 is a diagram of a dual-bus system according to some embodiments disclosed herein.

When batteries are connected in parallel, care must be taken to ensure that the voltage of each battery is close to all of the others prior to connection. A large voltage difference, which indicates a difference in the battery state of charge (SOC) when compared to the other batteries, will cause energy to flow from higher voltage batteries to lower voltage batteries. If the batteries are large and/or high power, this flow of energy can be sufficiently large to cause overheating of the wires, connections and batteries. In extreme cases the flow of energy can ignite and cause fires and damage to the batteries, equipment and serious injury to personnel.

Manually balancing the voltage of the batteries prior to connection can be time consuming and is prone to user error. Manual balancing is also not appropriate for systems such as Lithium Batteries which contain a battery management system as these batteries may disconnect from other batteries in the system due to an internal fault, and then attempt to re-connect to the system at a later time without the benefit of a human operator to first complete a manual balancing operation.

Computer controlled balancing of batteries is typically achieved through the use of an interrupter switch on the battery terminals which will not allow the batteries to be connected together in parallel unless certain conditions are met such as a measured voltage imbalance within certain bounds. Some systems include a balancing means such as a resistor that can be switched between the battery and the output terminals in order to allow the battery to be charged or discharged to the same voltage as the other batteries in the system.

Passive resistor based battery balancing is very slow as the amount of energy flowing through the resistor, and therefore the amount of balancing energy between the batteries, is dependent on the voltage difference. The closer the battery voltage, the lower the energy transfer rate. Therefore the balancing energy will get exponentially slower as the batteries become closer to balancing. The heat generated by the balancing circuit can also be quite high depending on the speed of the balancing. The faster the balancing and the larger the batteries, the more heat that must be dissipated in the balancing circuit.

An external battery balancing circuit may be employed that includes the battery terminal switching, computer system and heat-dissipation components in a system that is physically separated from the batteries. The advantage of such a system is that it removes the heat-generating components from the battery and can therefore typically handle larger balancing currents. The disadvantage of this system is that it requires wires from each battery to be tied into a control system. For large battery systems, the size, cost and weight of the wires can pose a problem, as can the reliability and maintenance of running large wires to many different batteries.

More advanced battery balancing means may employ a separate balancing bus. For example, PCT/CA2012/050929 (Carkner) teaches a battery with three terminals having positive and negative terminals (as on any typical battery) and a separate energy balancing terminal. The energy balancing terminal includes a current limiting circuit inside the battery such that energy may flow into or out of the energy balancing terminal at a controlled rate. The disadvantage of this system is that each battery includes this circuitry, which can be quite expensive and may lead to a loss of reliability, especially at higher power levels. In addition, the circuit will generate significant heat, particularly if it is based on a passive energy dissipating element such as a resistor. On very large systems, the amount of energy flowing through the energy sharing terminal can be quite high. For example, if there were one hundred batteries in the system, each with a one-ampere limit on the energy balancing terminal, and if half of the batteries were at a higher voltage and half were at a lower voltage, then a total of 50 amps of current would be injected into and taken from the energy sharing bus. The amount of current flowing through any given wire in the system will be dependent on the physical configuration of the system. For example, if all of the batteries were connected into an electrically long chain, and all of the higher voltage batteries were on one side of the chain and all of the lower voltage batteries were on the other side of the chain, then the maximum current flow of 50 amps would be realized at the mid-point between the two chains. However, if the batteries were randomly mixed, as is more often the case in a real-life situation, then the current at various points in the system would be similarly random. This potentially high level of current, and the unpredictability of the current, may be too large for the wiring to handle as the installer, in one example, may have incorrectly assumed that the one-ampere limit on the energy sharing terminals would allow only thin wires to be used.

Applicant has recognized a need for a system that allows parallel batteries to achieve a balanced voltage in a safe, reliable and cost effective way. Applicant has recognized a further need for a battery balancing system that reliably transfers a safe, controlled amount of energy between the batteries regardless of the number of batteries interconnected and their physical relation to each other.

Disclosed herein is a dual-bus battery balancing system. Embodiments of the dual-bus architecture result in a battery with effectively four power connection points.

A first connection point is the positive terminal of the battery, and a second connection point is the negative terminal of the battery. These terminals are the same or similar to terminals of typical prior art battery systems. They are primarily designed to carry the total power of the batteries between each other and the load or charger system. For battery technologies that include a battery management system, such as lithium-ion, one or both terminals may be connected to a switching system that allows the battery to switch off the terminals for safety, protection or management purposes.

The dual-bus system refers to the presence of two additional electrical connections specifically designed for balancing multiple batteries. The system adds two buses, namely a "high" bus that takes energy from the highest voltage battery in the system and a "low" bus that delivers energy to the lowest voltage battery in the system. In some embodiments, all of the high bus terminals are connected together, and all of the low bus connections are tied together.

In some embodiments, a single current limiter device connects the low bus and high bus together to allow energy to flow from the highest voltage battery in the system to the lowest voltage battery in a controlled way. A single current limiter may be used in some embodiments regardless of the number of batteries present in the system. In other embodiments, two or more current limiters may be used.

Referring to FIG. 1, one embodiment of a system that uses the dual-bus battery balancing system 100 is shown. Four battery modules 101 are connected in parallel with positive terminals 102 connected together and to the load 106, and negative terminals 103 connected together and to the load 106. The batteries include a battery management system (not shown in FIG. 1) that do not allow energy to flow to the output terminals 102, 103 if there is a large voltage difference between the internal battery cell-stack voltage and the external terminals. This is done as a safety precaution to ensure that excessive current and sparking does not occur when connecting together two batteries that have a large voltage (or state of charge) difference. Batteries based on Lithium Ion technology are particularly vulnerable to safety concerns when connected in parallel and benefit from a battery management system capable of disconnecting the output terminals.

Unlike a conventional battery system, each battery 101 also includes dual-bus battery balancing terminals. High bus terminals 104 are connected together by a high bus 108, and low bus terminals 105 are connected together by a low bus 109. High bus 108 and low bus 109 are connected through a current limiter 107. By using diodes (not shown in FIG. 1) which selectively electrically isolate the battery modules 101 from the high bus 108 or low bus 109, at any given time, a single battery 101 having the highest voltage is electrically connected to the high bus 108, and a single battery having the lowest voltage is electrically connected to the low bus 109.

As the voltage of a high voltage battery falls, it reaches the same voltage level as the next highest voltage battery in the system. Once these two batteries have identical (balanced) voltages, they both deliver energy into the high bus. This process repeats as the two high batteries then fall in voltage to the next highest battery. Similarly, as the voltage of the low battery rises, it reaches the same voltage level as the next lowest voltage battery in the system. Once these two batteries have similar, balanced voltages, they both absorb energy from the low bus. This process repeats as the two low batteries then rise in voltage to the next lowest battery.

As more of the batteries become balanced on the high bus and on the low bus, eventually all of the batteries in the system become part of either the balanced "high" group or the balanced "low" group. At this point energy continues to flow from the high group into the low group through the current limiter 107 until both groups reach the same voltage level, or near enough to the same level that the battery management system inside the battery can be safely connect power to the output terminals 102, 103. At this point, energy ceases to flow in the dual-bus balancing circuitry.

Even if the system consisted of hundreds of batteries, the current flowing through the balancing buses 108, 109 acts in a similar manner. In effect, as described above, the high bus 108 is electrically connected to the single battery with the highest voltage, and the low bus 109 is connected to the single battery with the lowest voltage. As the high battery transfers current into the low battery, its voltage eventually drops to the voltage of the next-highest voltage battery, and both batteries become the high bus's defining voltage. Similarly, the lowest battery receives current from the low bus 109 its voltage increases until it is no longer the lowest voltage, at which point the second-lowest voltage battery and third-lowest voltage battery join to become the defining low voltage of the low bus 109.

The current limiter 107 is shown diagrammatically as a resistive element. However, this element may be an active element such as a linear current regulator, or it may be a switching power converter, positive temperature coefficient fuse (PTC), a combination of these devices, or another device that is suitable to limit the current passing through it to a safe controlled level.

Some embodiments overcome many of the deficiencies of the prior art. For example, in some embodiments, the current flowing through the high bus 108 is no higher than the maximum amount that the current limiter allows. Because only the highest voltage battery 101 (or batteries, if several are at the same voltage) feed into the high bus 108, there is no path for higher current to flow anywhere else in this bus.

Similarly, the current flowing through the low bus 109 is also limited by the current limiter 107.

The current limiting element may be separated from the batteries in some embodiments. The physical separation of the current limiter reduces the chance that heat generated by the limiter could damage or affect the batteries. The use of a single limiter, instead of separate limiters in each battery as present in the prior art, may reduce cost, complexity, weight, and size. System reliability may increase because only one current limiter is used, and the current limiter may be robust, whereas prior art system use a plurality of separate current limiters.

Some embodiments provide an additional advantage in that balancing is accomplished automatically by the connection hardware, without the intervention of microcontrollers or software, and without the necessity of communication between the batteries. Because energy flows from highest potential to lowest potential, the highest voltage battery provides energy to the lowest voltage battery through the current limiting element without the need for intervention. In some embodiments, microcontroller, software, and/or communication between the batteries may be used for various aspects of the system.

Figure 2:
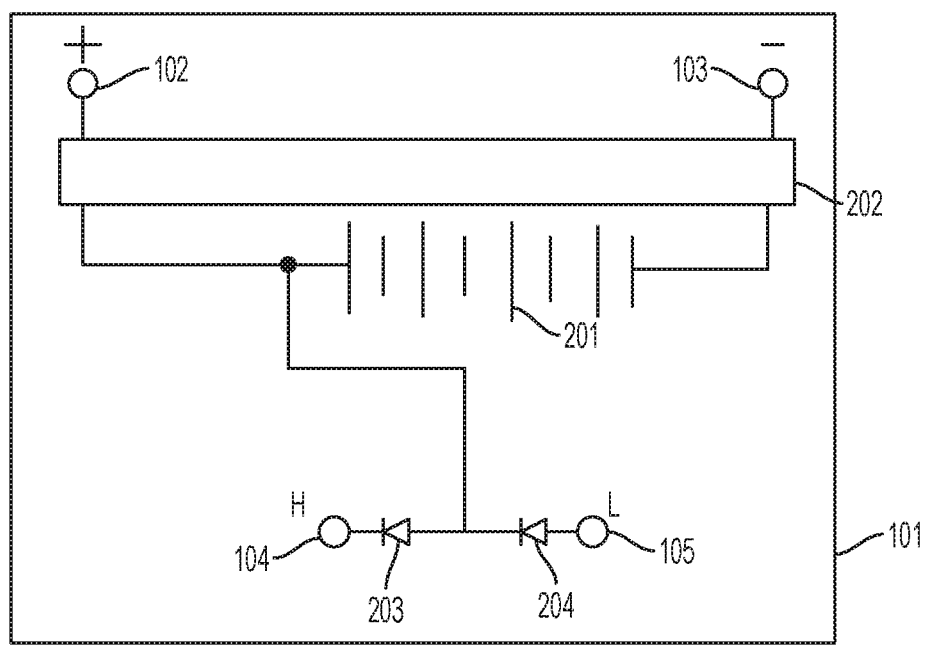
FIG. 2 is a diagram of a battery having dual-bus circuitry therein according to some embodiments.

Referring to FIG. 2, a single battery module 100 is shown to illustrate the simplicity of the battery module circuitry according to some embodiments. The battery module 100 includes the four terminals illustrated in FIG. 1 as a positive terminal 102, a negative terminal 103, a high bus terminal 104, and a low bus terminal 105.

The battery module includes one or more cells 201 and a battery management system 202 as is known in the art, wherein the battery management system monitors the cell characteristics and controls power to the battery output terminals (positive, negative, or both). This arrangement allows the battery management system to monitor the voltage difference between the internal cells 201 and the external terminals 102, 103, and to connect the output terminals only when the voltage difference is low enough to be safe to do so.

The high bus terminal 104 is provided through the use of a blocking diode 203. If the voltage of the battery cells 201 is higher than the voltage of the high bus, current flows through the diode 203 making this battery the one which defines the high bus voltage. If this battery's cells are at a lower voltage than the high bus, no current flows through the diode, and in particular, current is blocked by the diode 103 from flowing from the high bus 108 into the battery 201.

The low bus terminal 105 is also provided through the use of a blocking diode 204, which is in a polarity opposite to that of the high bus 108, resulting in the battery absorbing energy from the low bus 109 only if the voltage of the cells inside the battery is lower than the voltage of the low bus 109, therefore making this the battery which sets the voltage of the low bus 109. If the cells 101 in the battery 101 are at a voltage which is higher than the voltage of the low bus, then no energy flows into the battery and the diode 204 blocks current from flowing out of the low bus terminal 105 into the low bus and subsequently into other batteries in the system.

Although a standard diode symbol is used for both diodes 203, 204, in some embodiments, an ideal active diode element is used which is typically constructed from a comparator circuit and a transistor. This arrangement may allow nearly lossless current flow onto the dual buses. Because the current through this terminal is externally limited by the current limiter shown in FIG. 1, the circuitry to implement an ideal diode may be constructed to be very small.

Safety circuitry may be added to the terminals of the battery and may include fuses, monitoring, and control circuitry as is understood in the art.

In use, in a first step, a plurality of batteries are connected to the high bus and the low bus. Subsequently, the system is initiated with many batteries all at different voltage levels. The highest voltage battery gradually drops to the voltage level of the next highest battery, and the two batteries drop together to the next highest battery, and so on until all of the highest voltage batteries are at the same voltage level. In a similar manner, the lowest voltage battery charges up to the voltage level of the next lowest battery, the two batteries charge together to the next lowest battery, and so on until all of the lowest voltage batteries are at the same voltage level. The two groups of higher and lower voltage batteries continue to have their voltages equalize until all batteries in the system are at the same voltage. When the equalization is complete, the batteries are all connected together by their main power terminals and energy stops being transferred on the high and low balancing buses.

The battery management system in each battery may determine when it is safe to connect to the main power bus which is connected to the positive terminals 102 and negative terminals 103 of each battery. There may be a visual or audible indicator of the completion of the equalization. The decision of when to connect and whether the first connection should be the highest, lowest or another battery, is beyond the scope of this description as it does not affect the balancing of the batteries themselves.

Where all of the batteries in the system are at the same voltage, active circuitry associated with the diodes 203, 204 or current limiter 107 may be switched off to save energy. In some embodiments, the current limiter becomes an open circuit when the active circuitry is off.

For purposes of this patent application and any patent issuing thereon, the indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

The use of "including," "comprising," "having," "containing," "involving," and/or variations thereof herein, is meant to encompass the items listed thereafter and equivalents thereof as well as additional items.

It should also be understood that, unless clearly indicated to the contrary, in any methods claimed herein that include more than one step or act, the order of the steps or acts of the method is not necessarily limited to the order in which the steps or acts of the method are recited.

The foregoing description of various embodiments are intended merely to be illustrative thereof and that other embodiments, modifications, and equivalents are within the scope of the invention recited in the claims appended hereto.

What is claimed is:

1. A system for balancing voltage of batteries connected in parallel, the system comprising:

a first battery having a first positive terminal, a first negative terminal, a first high bus terminal, and a first low bus terminal;

a second battery having a second positive terminal, a second negative terminal, a second high bus terminal, and a second low bus terminal;

a third battery having a third positive terminal, a third negative terminal, a third high bus terminal, and a third low bus terminal;

a fourth battery having a fourth positive terminal, a fourth negative terminal, a fourth high bus terminal, and a fourth low bus terminal;

a high bus, the high bus electrically connected to each of the first, second, third, and fourth batteries at the first, second, third, and fourth high bus terminals, respectively;

a low bus, the low bus electrically connected to each of the first, second, third, and fourth batteries at the first, second, third, and fourth low bus terminals, respectively; and a current limiter electrically connecting the high bus and the low bus, wherein, each of the first, second, third, and fourth batteries is configured such that when at least one of the first, second, third, and fourth batteries differs in voltage level from another of the first, second, third, and fourth batteries, the high bus receives charge from the battery with the highest voltage level from among the first, second, third, and fourth batteries, the low bus receives charge from the high bus across the current limiter, and the battery with the lowest voltage level receives charge from the low bus until each of the first, second, third, and fourth batteries reaches the same voltage level as the others of the first, second, third, and fourth batteries.

2. A system as in claim 1, wherein each of the first, second, third, and fourth batteries is electrically connected to the high bus with a high bus diode configured to not allow current to flow from the high bus to the first, second, third, and fourth batteries.

3. A system as in claim 2, wherein each of the first, second, third, and fourth batteries is electrically connected to the low bus with a low bus diode configured to not allow current to flow from each of the first, second, third, and fourth batteries to the low bus.

4. A system as in claim 1, wherein when the first and second batteries are both at a high voltage level and the high voltage level is at a higher voltage than the high bus, the high bus receives charge from both the first and second batteries.

5. A system as in claim 4, wherein when the first battery is at first voltage level, and the second battery is at a second voltage level lower than the first voltage level, and both the first and second voltage levels are higher than a voltage of the high bus, the high bus receives charge from the first battery and not the second battery.

6. A system as in claim 5, wherein when the third battery is at a third voltage level, and the fourth battery is at a fourth voltage level lower than the third voltage level, and both the third and fourth voltage levels are lower than a voltage level of the low bus, the fourth battery receives charge from the low bus and the third battery does not receive charge from the low bus.

7. A system as in claim 1, wherein when first, second, third, and fourth positive terminals and negative terminals are connected to each other and to a load that is powered by the first, second, third, and fourth batteries.

8. A system as in claim 1, wherein the current limiter comprises a switching power converter.

9. A system as in claim 8, wherein the current limiter comprises a positive temperature coefficient fuse.

10. A system as in claim 1, further comprising a battery management system that monitors characteristics of cells of the batteries and controls power to the first, second, third, and fourth positive terminals and the first, second, third, and fourth negative terminals of the first, second, third, and fourth batteries.

11. A system as in claim 10, wherein the battery management system is configured to prevent energy flow to the first, second, third, and fourth positive and negative terminals of the first, second, third, and fourth batteries if a difference between a voltage of an internal cell-stack voltage and a voltage of either at least one of the first, second, third, and fourth positive or negative terminals exceeds a threshold.

12. A system as in claim 2, wherein at least one of the high bus diodes comprises an ideal active diode element.

13. A system as in claim 3, wherein at least one of the low bus diodes comprises an ideal active diode element.

* * * * *